(12) United States Patent
Becker et al.

(10) Patent No.: US 7,527,824 B2
(45) Date of Patent: May 5, 2009

(54) METHODS FOR PRODUCING COATED NANOPARTICLES FROM MICROPARTICLES

(76) Inventors: Michael F. Becker, 2734 Trail of the Madrones, Austin, TX (US) 78746; John W. Keto, 1808 Basin Ledge, Austin, TX (US) 78746; Desiderio Kovar, 4825 Twin Valley Dr., Austin, TX (US) 78731-3538

( * ) Notice: Subject to any disclaimer, the term of this patent is extended or adjusted under 35 U.S.C. 154(b) by 701 days.

(21) Appl. No.: 11/134,965

(22) Filed: May 23, 2005

(65) Prior Publication Data
US 2005/0287308 A1 Dec. 29, 2005

Related U.S. Application Data

(60) Provisional application No. 60/582,884, filed on Jun. 25, 2004.

(51) Int. Cl.
*B05D 7/00* (2006.01)

(52) U.S. Cl. .................. 427/212; 264/400; 264/482; 427/215; 427/216; 427/217; 427/561; 427/564; 428/403; 977/889; 219/121.11; 219/121.6; 219/121.85; 75/10.13; 75/336; 75/345

(58) Field of Classification Search ................ None
See application file for complete search history.

(56) References Cited

U.S. PATENT DOCUMENTS

| | | | | |
|---|---|---|---|---|
| 5,585,020 A * | 12/1996 | Becker et al. | ......... | 219/121.85 |
| 5,695,549 A * | 12/1997 | Feldman et al. | ......... | 96/55 |
| 6,017,381 A * | 1/2000 | Dunn et al. | ......... | 95/3 |
| 6,103,393 A * | 8/2000 | Kodas et al. | ......... | 428/570 |
| 6,254,928 B1 * | 7/2001 | Doan | ......... | 427/212 |
| 6,387,531 B1 * | 5/2002 | Bi et al. | ......... | 428/570 |

* cited by examiner

*Primary Examiner*—Michael Cleveland
*Assistant Examiner*—Joel G Horning
(74) *Attorney, Agent, or Firm*—Schwabe, Williamson & Wyatt, P.C.

(57) ABSTRACT

A method for producing composite, shelled, alloy and compound nanoparticles as well as nanostructured films of composite, shelled, alloy and compound nanoparticles by using laser ablation of microparticles is disclosed.

17 Claims, 5 Drawing Sheets

METHODS FOR PRODUCING COATED NANOPARTICLES FROM MICROPARTICLES

PRIORITY CLAIM

The present application claims priority to U.S. Provisional Application No. 60/582,884 filed on Jun. 25, 2004, which is incorporated herein by reference in its entirety.

BACKGROUND OF THE INVENTION

1. Technical Field

The present invention relates to nanoparticles and nanostructured films in general, and in particular to a method for producing composite, shelled, alloy and compound nanoparticles and nanostructured films. Still more specifically, the present invention relates to a method for producing composite, shelled, alloy and compound nanoparticles and nanostructured films by using laser ablation of microparticles.

2. Description of Related Art

In general, many applications can benefit from compositional variations on a nanoscale such applications include, for example, nanostructured giant magnetostrictive films, optical amplifier photonic materials, non-linear photonic materials, thermoelectric materials, magnetic materials, corrosion resistant alloys, etc. Three-dimensional nanostructured materials are typically required for all the above-mentioned applications.

Three-dimensional nanostructured materials can be produced by methods such as vacuum synthesis, gas-phase synthesis, condensed phase synthesis, high-speed deposition using ionized cluster beams, consolidation, high-speed milling, etc. But those methods commonly suffer from a variety of problems such as agglomeration, broad size distribution, low volume production, impurity, surfactant requirement, environmental unfriendness, etc. Basically, nanostructured materials are difficult to produce in size scales that are practical for many applications using existing manufacturing technologies.

It has been known that supersonic jet deposition of nanoparticle aerosols generated by a laser ablation of microparticles (LAM) can be used to directly write films, micron-scale lines, and other structures onto substrates. The present disclosure provides a method that extends the LAM process for producing composite, shelled, alloy and compound nanoparticles as well as nanostructured films of composite, shelled, alloy and compound nanoparticles.

SUMMARY OF THE INVENTION

Nanoparticles can be produced by initially generating an aerosol gas of microparticles of Material A. Then, a first ablation is performed on the aerosol gas of microparticles of Material A to transform the aerosol gas of microparticles of Material A to an aerosol gas of nanoparticles of Material A. Next, an aerosol gas of microparticles of Material B is added to the aerosol gas of nanoparticles of Material A. Finally, a second ablation is performed on a mixture of the aerosol gas of microparticles of Material B and the aerosol gas of nanoparticles of Material A to transform the aerosol gas of microparticles of Material B to an aerosol gas of nanoparticles of Material B. The second ablation also allows the nanoparticles of Material A to be nucleated by the nanoparticles of Material B to form nanoparticles.

Nanoparticles can also be generated by initially producing an aerosol gas of microparticle mixture of two different materials, such as Material A and Material B. Then, the aerosol gas of microparticle mixture of the two different materials is passed through an energy beam to produce alloy or compound nanoparticles of the two different materials.

Nanoparticle films can be produced by initially generating an aerosol gas of microparticles of Material A and an aerosol gas of microparticles of Material B. Then, the aerosol gas of microparticles of Material A and the aerosol gas of microparticles of Material B are separately and concurrently passed through an energy beam. During the ablation, the aerosol gas of microparticles of Material A is transformed to an aerosol gas of nanoparticles of Material A while the aerosol gas of microparticles of Material B is transformed to an aerosol gas of nanoparticles of Material B. Finally, the nanoparticles of Materials A and B are deposited on a substrate in separate flows to produce a composite nanoparticle film of Materials A and B.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 is a diagram of an apparatus for performing laser ablation of microparticles (LAM);

FIG. 2 is a diagram of an apparatus for collecting nanoparticles, in accordance with a preferred embodiment of the present invention;

FIG. 3 is a diagram of an apparatus for producing nanoparticles, in accordance with a preferred embodiment of the present invention;

FIG. 4 is a diagram of an apparatus for producing nanoparticles, in accordance with a second embodiment of the present invention;

FIG. 5 is a diagram of an apparatus for producing nanoparticles, in accordance with a third embodiment of the present invention; and FIG. 6 is a diagram of an apparatus for producing composite nanoparticle films, in accordance with a preferred embodiment of the present invention.

DETAILED DESCRIPTION OF A PREFERRED EMBODIMENT

Microparticles are employed as starting materials in the production of nanoparticles. Microparticles can be composed of a wide variety of materials of any shape. Preferably, such materials are solids at room temperature and are not susceptible to chemical degradation during the practice of the present invention. Representative examples of suitable materials include silica, alumina, alloys, inorganic and organic compounds, metals (such as gold, silver, palladium, nickel and iron), oxides and sulfides.

I. Laser Ablation of Microparticles

Referring now to the drawings and in particular to FIG. 1, there is depicted a diagram of an apparatus for performing laser ablation of microparticles (LAM). As shown, an appropriate amount of microparticles is initially placed in an aerosol feed source 14. Within aerosol feed source 14, the microparticles are entrained in an aerosol gas. The microparticles in an aerosol form continue through a line 11 and enter a laser ablation chamber 19 in which microparticles are moved through a laser beam 15 for performing laser ablation. The laminarity of the aerosol stream of microparticles within laser ablation chamber 19 is maintained by a coaxial flow of buffer gas through a line 12. The velocity of the aerosol stream of microparticles passing through laser beam 15 can be controlled by aerosol feed source 14 and a nozzle 16.

Laser beam 15 is generated by a laser (not shown). Any commercially available laser capable of generating a laser light having wavelengths in the range between 0.15 and 11 microns can be employed to generate laser beam 15. The selection of a specific laser depends on the optical properties of the microparticles and the size of the nanoparticles desired. Similarly, the power of the required laser also varies, depending on the above-mentioned variables. The laser should be capable of generating a fluence of about 0.1 to about 10 joules per square centimeter ($J/cm^2$) if a laser pulse of 1 to 100 nanoseconds is used, or an irradiance of $10^8$ to $10^{11}$ watts per square centimeter ($W/cm^2$) if a laser pulse of above or below 1 to 100 nanoseconds is used.

Laser beam 15 with a wavelength of 248 nanometer can be generated using a KrF excimer laser having a 12 nanosecond pulse length. Laser beam 15 with a wavelength of 533 nanometer can be generated by a frequency-doubled Nd:YAG laser having an 8 nanosecond pulse length. Laser beam 15 with a wavelength of 1064 nanometer can be generated by a fundamental frequency Nd:YAG laser having a 10 nanosecond pulse length.

Many methods can be employed for providing an aerosol source of microparticles substantially free of contact during laser ablation. One method involves passing a moving stream of gas through a bed of microparticles such that microparticles become entrained in the moving gas, and the moving stream of gas is then passed through laser beam 15. For example, argon or other inert gases can be injected to aerosol feed source 14 from a pressurized gas source. Alternatively, microparticles can be pulled via a vacuum through laser beam 15. In addition, a defined quantity of microparticles can be dropped through laser beam 15 through a screw or plunger. Microparticles can also be mechanically thrown into a gas stream.

Preferably, microparticles have a diameter greater than the wavelength of laser beam 15 but less than 100 microns. Laser beam 15, passes through crossed a set of cylindrical lenses (not shown) to control the focus on the aerosol stream of microparticles. Laser beam 15 enters through a window before converging to the aerosol stream of microparticles.

In order to conserve energy, laser beam 15 is preferably emitted in pulses. In a preferred embodiment, the microparticles can be moved into the focus of laser beam 15. The speed of the stream of microparticles and the pulse repetition frequency of laser beam 15 can be adjusted such that laser beam 15 illuminates the microparticles for the time needed to ablate a given quantity of microparticles, and then turns off until a new batch of microparticles is dropped in the field of laser beam 15.

The mean diameter of nanoparticles produced can be adjusted by varying the energy of laser beam 15, the pressure of the aerosol gas, and the type of aerosol gas. At a given laser light wavelength, increasing fluence results in decreasing mean nanoparticle diameter for a given mean diameter of microparticle starting material. In addition, increasing the mean diameter of microparticle starting material at a given laser beam wavelength and fluence leads to a decrease in mean diameter of the nanoparticles produced. Generally, a larger fluence, a higher optical energy inside a microparticle, or a larger optical absorption of microparticles leads to the formation of nanoparticles with a smaller mean diameter.

There is also a correlation between laser beam wavelength and nanoparticle size, which depends on the optical properties of microparticles. As such, the selection of laser beam wavelength can be used to control the size of nanoparticles produced. Also, larger nanoparticles are usually formed in argon and nitrogen, and smaller nanoparticles are usually formed in helium. Furthermore, larger nanoparticles are formed at higher aerosol gas pressures (above one atmosphere) and smaller nanoparticles are formed at lower aerosol gas pressure (below one atmosphere).

A skimmer 17 of shape similar to nozzle 16 is used to separate the aerosol containing nanoparticles from the coaxial buffer gas. The nanoparticle aerosol is moved through a gas line 18 to a device capable of removing the unablated microparticles. The nanoparticles can also be filtered so as to narrow their size distribution prior to collection or deposition. After the unablated microparticles and larger nanoparticles have been removed, nanoparticles are collected or deposited in a collection module 20.

Figure 2:
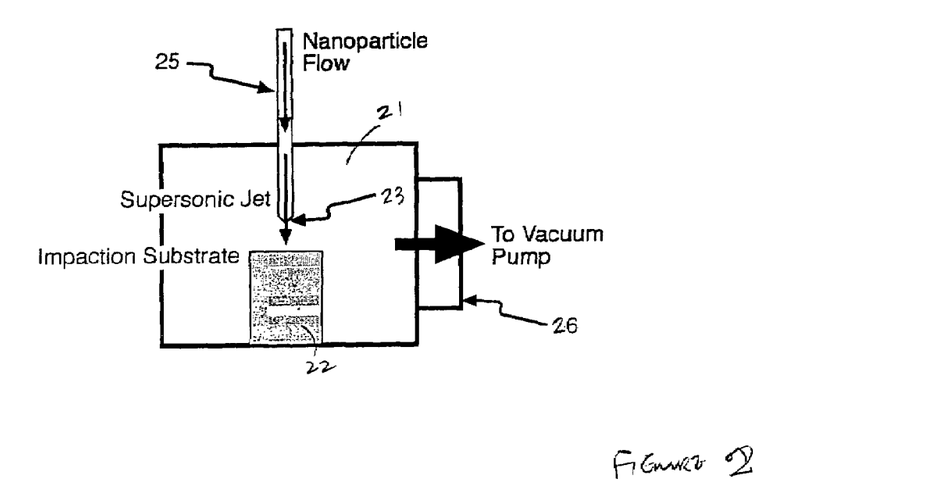

With reference now to FIG. 2, there is depicted a diagram of deposition module 20 for collecting nanoparticles, in accordance with a preferred embodiment of the present invention. As shown, nanoparticle aerosol moves though a line 25 and a nozzle 23 to an impaction chamber 21 using a vacuum pump (not shown). Vacuum is maintained in impaction chamber 21. The converging cone angle, nozzle length, nozzle throat diameter, and nozzle diverging cone angle of nozzle 23 can be used to control the impaction velocity of nanoparticles on an impaction substrate 22 within impaction chamber 21. Impaction substrate 22 can be moved under nozzle 23 in order to control the deposition of nanoparticles into films and lines. Alternatively, a fluid film of surfactant can be flowed over impaction substrate 22 to collect nanoparticles for future use. Because the produced nanoparticles are left charged by the energy beam, the produced nanoparticles can be deflected and subsequently collected by electric fields.

During exposure to an energy beam, such as laser beam 15, microparticles are substantially free of contact among individual microparticles. While a few microparticles may be in contact with each other during the process, the great majority of microparticles should not be in contact. The greater the number of microparticles that are in contact in a given mass of microparticles, the greater the microparticles as a whole will behave as a bulk material such as a solid bar. Preferably, less than 1% of microparticles are in contact while being illuminated with laser beam 15 to cause laser ablation. It is understood that microparticle agglomerates having less than 10,000 primary particles per agglomerate can serve as the source of microparticles. Of course, microparticles are preferably not agglomerated. The particle density of microparticles during exposure to laser beam 15 is less than $1\times10^9$ particles per cubic centimeter.

Laser beam 15 has sufficient energy to ablate microparticles directly, without the microparticles being heated to liquid, followed by the boiling of the liquid to vapor. To bring about direct laser ablation of microparticles, it is necessary to employ an energy beam of sufficient energy to exceed the plasma formation threshold of the microparticles by a factor of at least 1.5. By comparison, the heating/boiling/vaporization of materials generally employs energy of less than a factor of 1 of the plasma formation threshold. The appropriate energy can be determined via experimentation where energy levels of the energy beam are increased and products observed. For 8 micron silica microparticles, the plasma formation threshold was found to be at a fluence of about 0.5 J/cm.sup.2 using a laser beam at a wavelength of 1,064 nm.

The determination of the size distribution of nanoparticles generated requires a large number of individual nanoparticles so that a statistically significant distribution can be obtained. A transmission electron microscope (TEM) can be used to obtain photomicrographs of nanoparticles. For example, nanoparticles can be deposited onto a carbon support grid and placed directly into the TEM. The photomicrographs can also be digitized and processed using well-known methods.

II. Producing Nanoparticles

Figure 1:
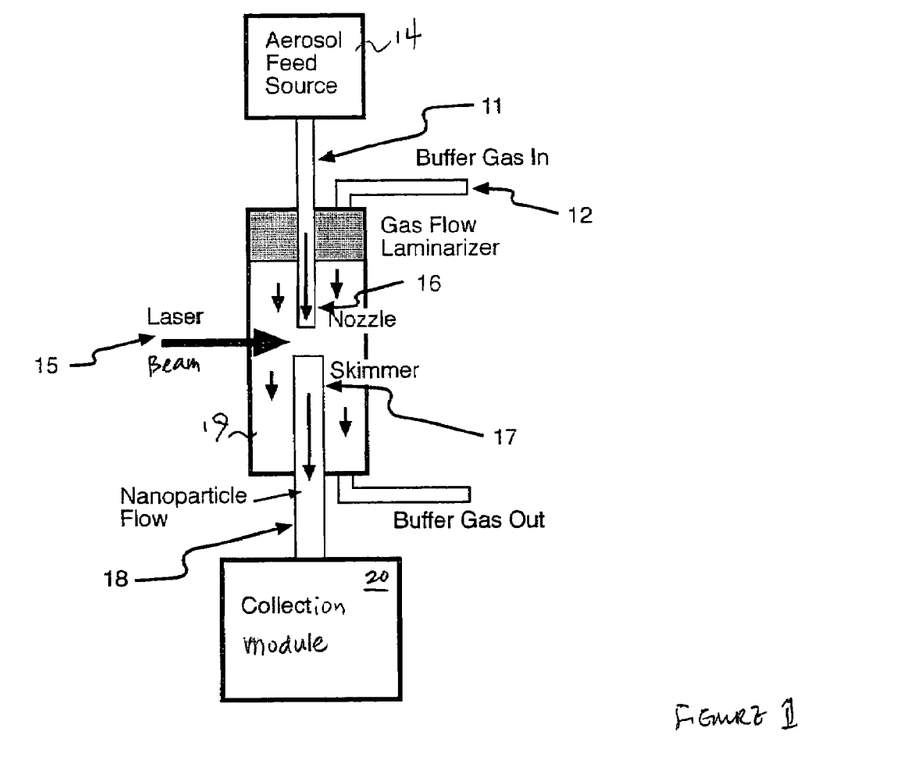
Figure 3:
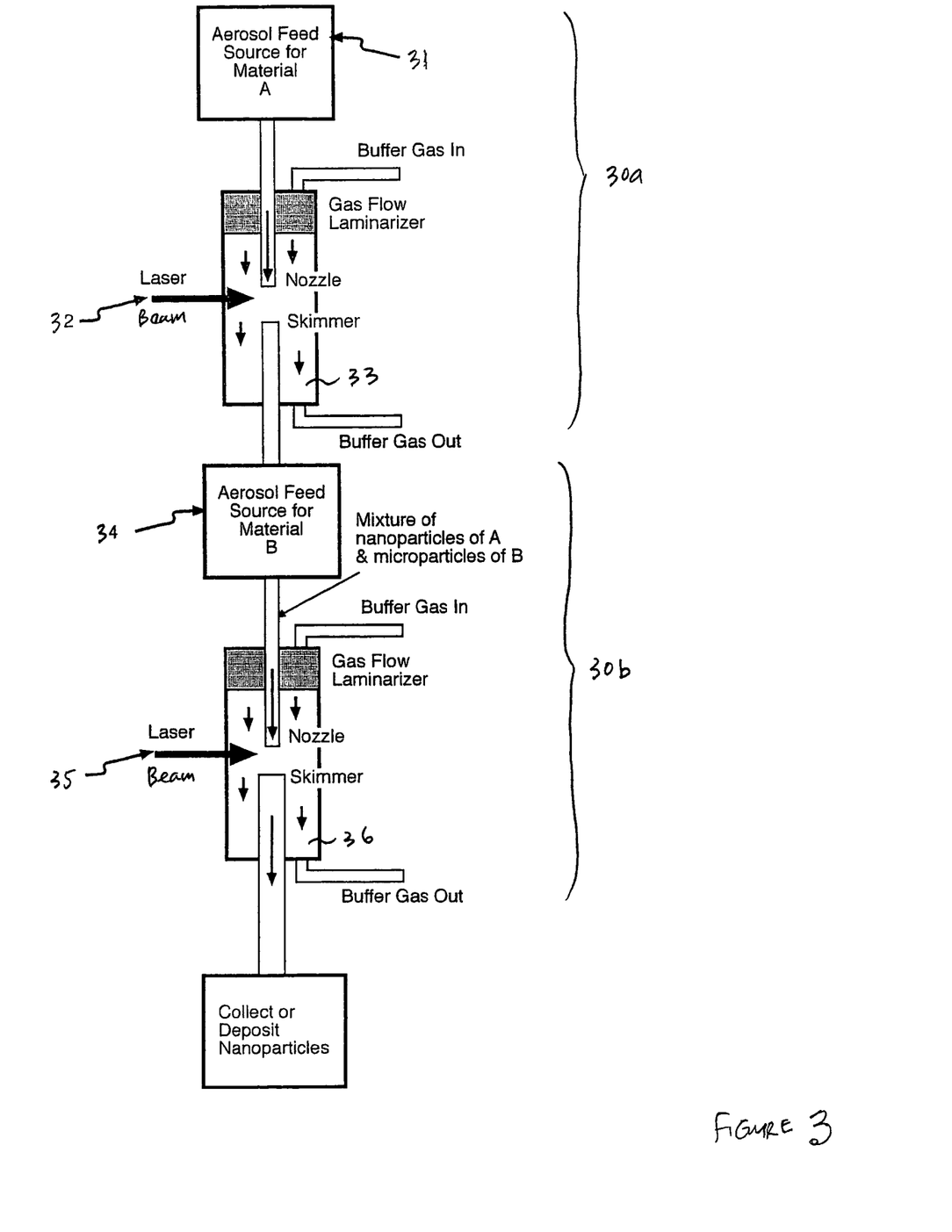
Figure 4:
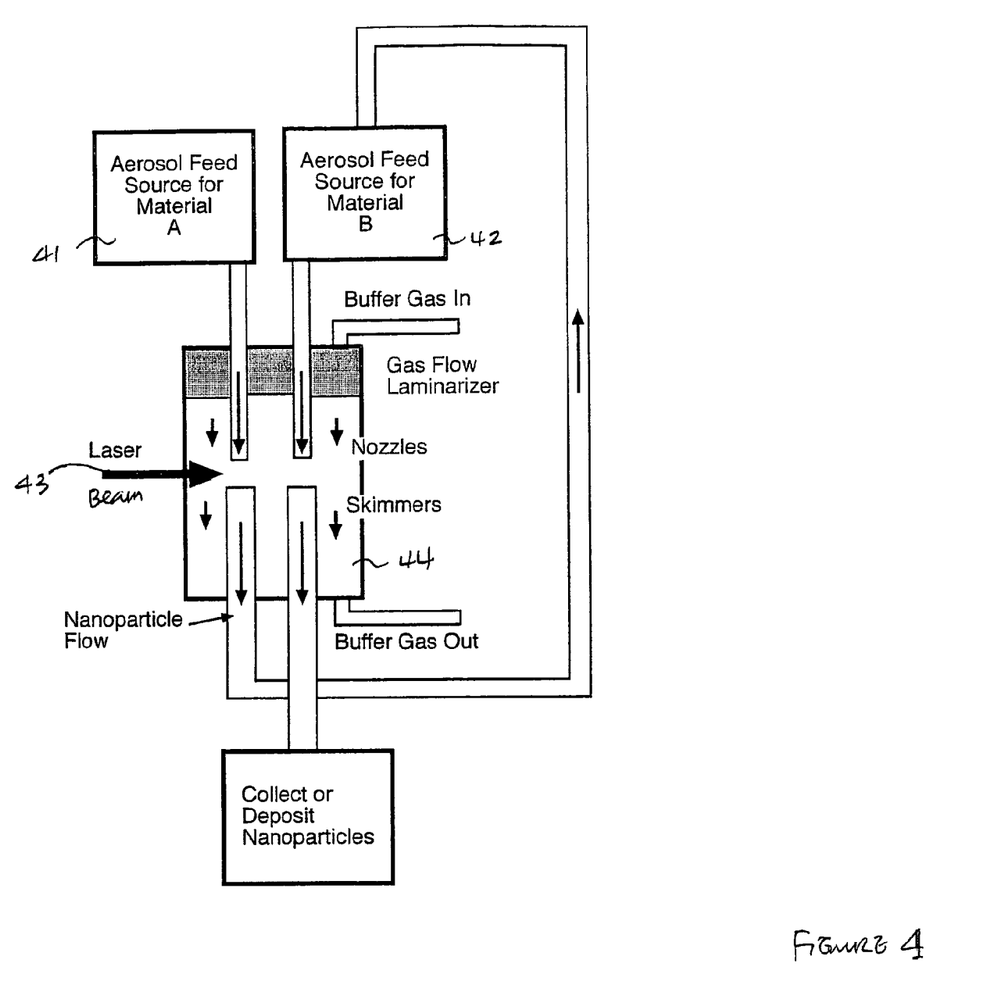
Figure 5:
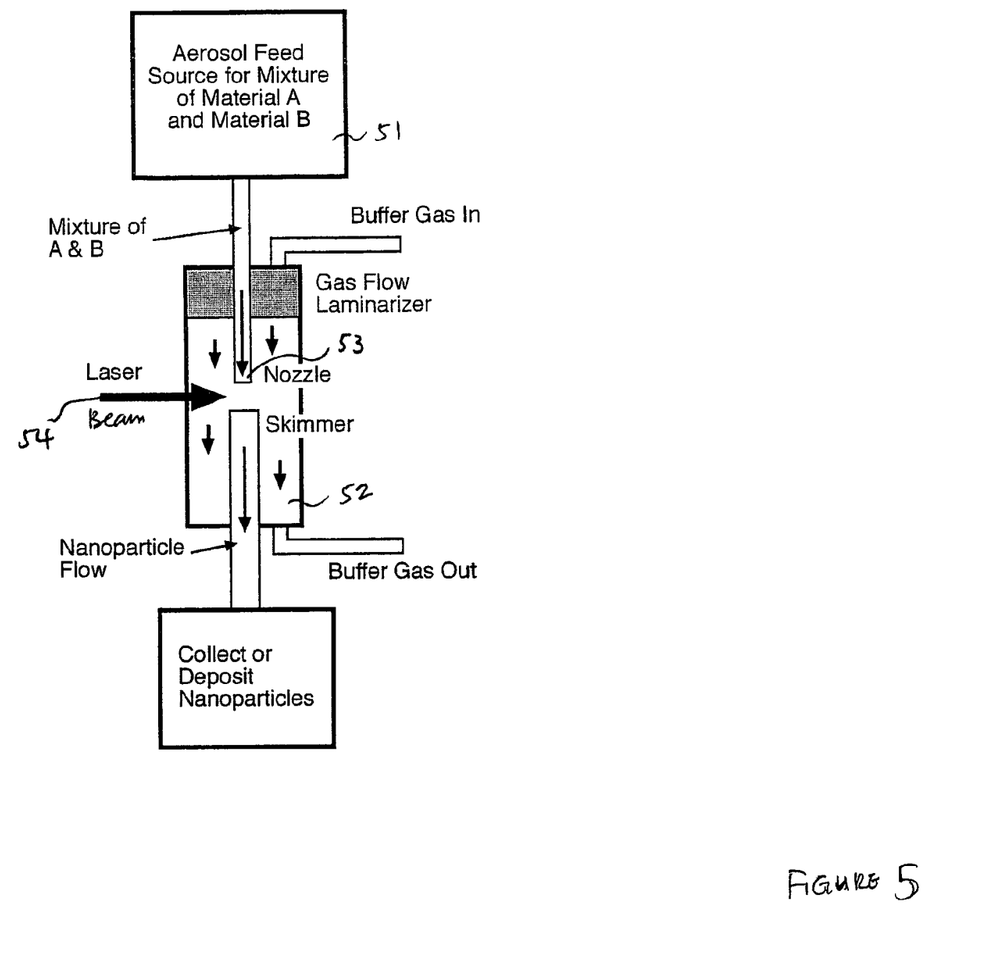

Referring now to FIG. 3, there is illustrated a diagram of an apparatus for producing nanoparticles, in accordance with a preferred embodiment of the present invention. The preferred embodiment is described in terms of producing shelled nanoparticles, but it is understood by those skilled in the art that the preferred embodiment can be also used to produce alloy, compound and mixture nanoparticles. Shelled nanoparticles are nanoparticles having a core of one phase (or composition) covered by a shell with a different phase (or composition). As shown, the apparatus includes an ablation module 30a and an ablation module 30b. Each of ablation modules 30a-30b is similar to the one depicted in FIG. 1. In a first aerosol feed source 31, microparticles of Material A are aerosolized and then laser ablated by a laser beam 32 in a first laser ablation chamber 33 to form nanoparticles of Material A. Remaining in the aerosol gas form, nanoparticles of Material A move to a second aerosol feed source 34 in which microparticles of Material B are added to the aerosol gas of nanoparticles of Material A. The mixture is then moved to a second laser ablation chamber 36.

Within second laser ablation chamber 36, a laser beam 35 heats the nanoparticles of Material A uniformly because their size is much smaller than the wavelength of laser beam 35. With uniform heating, no shock can form in the nanoparticles of Material A and they are simply evaporated to form an atomic or molecular vapor. Shock heating by laser beam 35 in the microparticles of Material B causes the formation of nanoparticles of Material B. The nanoparticles of Material B can then heterogeneously nucleate the vapor of Material A. If the materials are immiscible or the seed particles have sufficiently cooled, a shelled nanoparticle is formed.

Using the methods described in the preferred embodiment and depending on the conditions of operation of the apparatus, the produced nanoparticles can also be mixtures of A and B, alloys or compounds of A and B, or mixtures thereof. The resulting nanoparticles can be collected or impacted to form nanostructured films using one of the methods described previously.

Depending upon the size of the nanoparticles produced in first laser ablation chamber 33, their optical absorption that is controlled by the real and imaginary parts of their index of refraction, their thermodynamic properties such as heat of vaporization and vapor pressure, the laser fluence may be insufficient to completely vaporize the particles. In some cases, such as ZnS particles, they may decrease in radius only by 1-10%. These particles can then act as seed nucleation sites for condensation of vapor produced by the laser ablation of the microparticle of Material B. If the density of nanoparticles in the aerosol coming from first laser ablation chamber 33 is sufficient, such nucleation may dominate and all of the nanoparticles will have cores of Material A covered by shells of Material B. Under such conditions, any type of shelled nanoparticles can be produced by choosing the type of microparticle material to be placed into first aerosol feed source 31.

Alternatively, one can ensure that the nanoparticles of Material A completely evaporate during the second ablation process, if their size is made sufficiently small. This can be accomplished by adjusting the flow velocity and the length of laser beam 32 in first laser ablation chamber 33 so that the nanoparticles of Material A are evaporated by a series of pulses of laser beam 32 after being created by the first laser pulse. The success of such technique depends upon the density of nanoparticles of Material A and the vapor of Material A leaving first laser ablation chamber 33, and the distance between laser ablation chambers 33 and 36, since nanoparticles may grow in size during the transport time.

With reference now to FIG. 4, there is illustrated a diagram of an apparatus for producing nanoparticles, in accordance with a second embodiment of the present invention. As shown, a single laser ablation chamber 44 is used to combine the aerosol streams of two different materials in order for a laser beam 43 to perform laser ablation. This requires that the particles in the streams absorb less than ½ of laser beam 43. The flows can also be arranged in a U-shaped geometry to minimize the flow distance from the first to the second laser ablation region. Two flow tubes enclosing the coaxial gas streams can hydrodynamically isolate the ablation streams.

In a test under the embodiment shown in FIG. 4, microparticles of ZnS with size ranging from 0.5 to 10 μm were used as Material A, and microparticles of CdSe of similar properties were used as Material B. Because the ZnS nanoparticles did not evaporate in the second laser ablation, shelled nanoparticles with a ZnS core and CdSe shell were produced. For this test, the aerosol sources were identical drum devices where the powder was mechanically dispersed into the aerosol gas with a density of $10^6$ particles per $cm^3$ of volume. The process worked well for microparticle densities ranging from $10^5$ to $10^7$ particles per $cm^3$.

It is possible to supersonically impact single-phase nanoparticles onto substrates to form films and patterned lines. If shelled nanoparticles are supersonically impacted, nanocomposite films having Materials A and B are produced. By moving the substrate relative to the supersonic nozzle, patterned films/lines can be produced from the nanocomposites. Collection module 20 (details shown in FIG. 2) can be used to deposit such nanoparticles into a composite film.

Referring now to FIG. 5, there is illustrated a diagram of an apparatus for producing nanoparticles, in accordance with a third embodiment of the present invention. The third embodiment is described in terms of producing composite nanoparticles, but it is understood by those skilled in the art that the preferred embodiment can be also used to produce shelled, alloy, compound and mixture nanoparticles. As shown, a microparticle mixture containing appropriate amounts of Materials A and B are placed into a single aerosol feed source 51. Aerosol feed source 51 is used to generate an aerosol mixture of Materials A and B. The carrier gas type, aerosol density of microparticles, gas pressure, and the flow rates are consistent with the LAM process described previously. It should be apparent that it is also possible to feed Materials A and B using separate aerosol feed sources, and this may be desirable if the properties (such as density or particle size) of the microparticles of Materials A and B are substantially different such that the rate of feeding of the two materials is not consistent with the composition of the mixture within aerosol feed source 51.

Consistent with the LAM process, the aerosol mixture is brought into a laser ablation chamber 52 located directly beneath a nozzle 53 with a surrounding gas to maintain laminar flow during laser ablation. The nature of the nanoparticles produced from laser ablation by laser beam 54 can be varied by controlling the aerosol density of the microparticles. For example, at low densities (i.e., less than $10^6$ microparticles per $cm^3$), the vapor expansion of individual microparticles following laser ablation of Materials A and B do not overlap. In this case, the nanoparticles formed include only of either Material A or B, but are not mixed. At higher microparticle aerosol densities (i.e., greater than $10^7$ microparticles per $cm^3$), some mixing of the vapors may occur prior to condensation of the nanoparticles. If mixing occurs, alloy, compound, or shelled particles of Materials A and B may result, depending on the laser ablation conditions (such as the size of the microparticles and the power of laser beam 54), thermodynamic properties of Materials A and B and the rate of cooling of the nanoparticles. If the mixing of the vapors is incomplete, then the composition of the resulting nanoparticles will vary, depending on the location of the nanoparticle when it was being nucleated. At high aerosol densities of the microparticles, the mixing of the vapor expansions will be complete and the variation in the composition of the resulting nanoparticles is reduced.

The resulting nanoparticle aerosol stream is a laminar flow that can be collected as nanoparticles or impacted to produce films, as described previously. If the nanoparticles are deposited into films, they can include homogenous alloys, homogeneous compounds or heterogenous nanocomposite structures depending on the laser ablation conditions. For example, if high aerosol densities are used such that the produced nanoparticles are alloys or compounds with the same or similar compositions, then the resulting films will be alloys or compounds. At lower aerosol densities, the nanoparticles produced may be shelled or have varying composition such that nanocomposite films will be formed.

III. Producing Nanostructured Films

Figure 6:
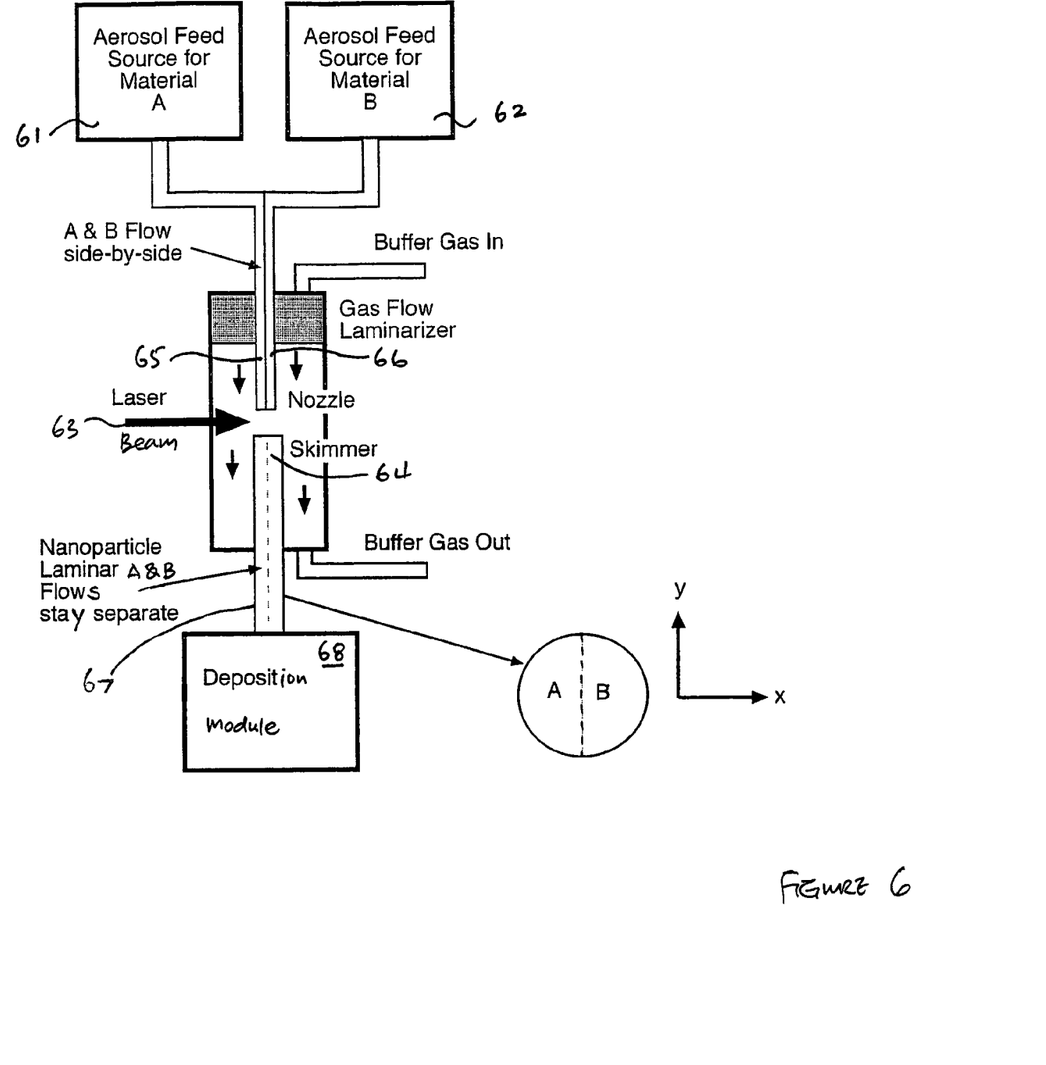

With reference now to FIG. 6, there is illustrated a diagram of an apparatus for producing nanostructured films, in accordance with a preferred embodiment of the present invention. As shown, microparticle aerosols of Materials A and B are produced in separate aerosol feed sources 61 and 62. The carrier gas type and pressure is consistent with the LAM process. The aerosol densities of the microparticles are also consistent with those required for the LAM process. The aerosol flows of Materials A and B are brought into a laser ablation chamber 64 side-by-side and released at identical velocities by nozzles 65 and 66 located side-by-side. The laminar flow of the surrounding gas in laser ablation chamber 64 is also moving at the same velocity in order to preserve laminar flow of the aerosol streams.

A laser beam 63 performs laser ablation on separate aerosol streams of Materials A and B. Microparticles of Materials A and B are laser ablated by laser beam 63 in separate laminar regions of flowing gas. Laser beam 63 irradiates both flowing aerosol streams to produce nanoparticles. As shown, laser beam 63 is arranged to first pass through the aerosol of Material A and then through the aerosol of Material B. This requires that the particles in the stream of Material A absorb less than ½ of laser beam 63. Alternatively, laser beam 63 may be oriented at another angle (i.e., other than 90 degree as shown in FIG. 6) in order to achieve the desired ablation strength. When using laser beam 63 having a pulse rate of 200 Hz and a focused beam height of 4 mm, for example, the aerosol velocity should be around 0.8 m/s in order to insure that all the microparticles are ablated.

The laminar flow is maintained when the two streams of nanoparticles of Material A and Material B are combined into a single laminar flow. The resulting nanoparticle aerosol stream is a laminar flow and is composed of segregated flows of Material A and Material B. A skimmer 64 gathers the entire flow includes both Materials A and B. Laminar flow is maintained in a short tube 67 connecting skimmer 64 to a deposition module 69 (similar to collection module 20 in FIG. 2). The cross-section of the flow in tube 67 is shown in the inset in FIG. 6. As the nanoparticle aerosol is accelerated through a deposition jet (not shown) in deposition apparatus 69, laminar flow is maintained. The deposition jet also has a cross-section similar to the inset in FIG. 6, and the material regions will remain segrated.

During deposition, a deposition substrate is moved relative to the deposition jet in order to have lines, patterns and films written on the deposition substrate. If the deposition jet moves in the +x direction (to the right) as shown in the inset of FIG. 6, then a layer of Material B will be deposited first and then covered by a layer of Material A. Conversely, if the deposition jet moves in the −x direction (to the left), then a layer of Material A will be deposited below a layer of Material B. Depending on the aerosol density fed to the laser ablation process and the velocity of the deposition jet, the thickness of the film layers may be adjusted from less than a monolayer of nanoparticles to greater than 1 μm in thickness. In the case of sub-monolayer film thickness, the nanoparticles of Material A and Material B will be intermingled in a nanocomposite material. Depending on the relative quantity of the materials in each part of the deposition jet, a nanocomposite film of nano-regions of Material A in Material B, the opposite, or roughly equal parts of Material A and Material B in a nanocomposite can be produced The deposition jet may be translated relative to the deposition substrate in other directions in order to achieve different effects. If the deposition jet is translated in the +y direction as shown in the inset of FIG. 6, then the materials will be deposited side-by-side, and a line will be deposited with Material A on the left and Material B on the right. This configuration might be beneficial when depositing a heterojunction in a single step process.

As has been described, the present invention provides a method for producing nanoparticles by using LAM. The present invention allows alloy nanoparticles, shelled or nanocomposite nanoparticles, nanocomposite films, and other two-dimensional structures to be produced at high production rates (grams/hour). Alloy nanoparticles can have unique chemical reactivity where the oxidation or corrosion of the material can be modified by the addition of a small amount of another element. Non-equilibrium phases can be formed that are not accessible via conventional chemical processes. Nanocomposite films and structures, as described above, can have enhanced nonlinear optical properties that make them ideal for optical wavelength conversion devices for photonic applications. Finally, nanocomposite magnetic alloys have enhanced properties when interacting with electromagnetic radiation and when used as magnetostrictive actuator materials.

Compared to existing technologies, the method of the present invention offers several advantages such as the ability to fabricate nanoparticles (1) that have a mean diameter that can be controlled, (2) that preserve overall composition of the feedstock material, (3) that are initially non-agglomerated without the need for a surfactant that can be difficult to remove for subsequent processing, (4) from virtually all inorganic solids, and (5) that can be scaled to the production of large quantities.

While the invention has been particularly shown and described with reference to a preferred embodiment, it will be understood by those skilled in the art that various changes in form and detail may be made therein without departing from the spirit and scope of the invention.

What is claimed is:

1. A method for producing nanoparticles, said method comprising:

performing a first ablation on an aerosol gas of microparticles of a first material to transform said aerosol gas of microparticles of said first material to an aerosol gas of nanoparticles of said first material;

adding an aerosol gas of microparticles of a second material to said aerosol gas of nanoparticles of said first material; and performing a second ablation on said microparticles of said second material and said aerosol gas of nanoparticles of said first material to transform said aerosol gas of microparticles of said second material to an aerosol gas of nanoparticles of said second material, such that said nanoparticles of said first material are nucleated by said nanoparticles of said second material.

2. The method of claim 1, wherein said first ablation and second ablation are performed via a first and second energy beams, respectively.

3. The method of claim 2, wherein said first and second energy beams are laser beams having wavelengths in a range between 0.15 and 11 microns.

4. The method of claim 1, wherein said first ablation and second ablation are performed via a single energy beam.

5. The method of claim 4, wherein said single energy beam is a laser beam having a wavelength in a range between 0.15and 11microns.

6. The method of claim 4, wherein each of said microparticles of said second material and said nanoparticles of said first material absorb less than half of the energy of said single energy beam during said second ablation.

7. The method of claim 1, wherein said method further includes collecting said nanoparticles using a collection module.

8. The method of claim 7, wherein said collecting further includes collecting said nanoparticles using an electric field.

9. The method of claim 1, wherein said nanoparticles include shelled, alloy, compound, or mixtures thereof.

10. The method of claim 5, wherein the laser beam has a wavelength of 533nanometers and has a pulse length of 8 nanoseconds.

11. The method of claim 5, wherein the laser beam has a wavelength of 248nanometer and has a pulse length of 12 nanoseconds.

12. The method of claim 5, wherein the laser beam has a wavelength of 1064nanometer and has a pulse length of 10 nanoseconds.

13. The method of claim 5, wherein the laser beam has an energy sufficient to exceed a plasma formation threshold of each of the microparticles of the first material and the microparticles of the second material by a factor of at least 1.5.

14. The method of claim 13, wherein the laser beam has a fluence of about 0.5 $J/cm^2$.

15. The method of claim 1, further comprising filtering, based at least in part on size, the nanoparticles of the first material nucleated by the nanoparticles of the second material.

16. The method of claim 1, further comprising depositing onto a substrate the nanoparticles of the first material nucleated by the nanoparticles of the second material.

17. The method of claim 1, wherein the performing of the first ablation comprises shock heating the microparticles of the first material to form the nanoparticles of the first material, and wherein the performing of the second ablation comprises vaporizing the nanoparticles of the first material to form a vapor of the first material.

* * * * *

UNITED STATES PATENT AND TRADEMARK OFFICE
CERTIFICATE OF CORRECTION

PATENT NO. : 7,527,824 B2  
APPLICATION NO. : 11/134965  
DATED : May 5, 2009  
INVENTOR(S) : Michael F. Becker et al.

Page 1 of 1

It is certified that error appears in the above-identified patent and that said Letters Patent is hereby corrected as shown below:

In the Specification

Column 1

Lines 9-10, under "Priority Claim", insert -- This invention was made with government support under Grant no. 9978926 and 0304031 awarded by the National Science Foundation. The government has certain rights in the invention. --

Signed and Sealed this
Twenty-fifth Day of August, 2015

Michelle K. Lee
*Director of the United States Patent and Trademark Office*